United States Patent Office 3,701,672
Patented Oct. 31, 1972

3,701,672
BITUMINOUS FIBROUS BUILDING PRODUCT AND METHOD OF PREPARING SAME
David L. Ruff and Nadeem U. Siddiqui, Torrance, Calif., assignors to Grefco, Inc., Philadelphia, Pa.
No Drawing. Filed Mar. 27, 1970, Ser. No. 23,462
Int. Cl. C08h 13/00, 17/02, 17/66
U.S. Cl. 106—282                    7 Claims

ABSTRACT OF THE DISCLOSURE

A building product is disclosed comprising expanded perlite and a specifically prepared corrugated boxboard based fiber. The building product exhibits superior properties in the strength and abrasion resistance categories among others.

---

This invention deals with a biulding product and specifically a method for its preparation. It more particularly deals with a building product made from expanded perlite. Although expanded perlite has been used in the art in the thermal insulation board category, usually along with newsprint paper, the results have left something to be desired. While these prior products have had considerable utility in the field of thermal insulation, there have been significant shortcomings in areas of strength and abrasion resistance. Many attempts using various additives have been made to improve one or more of the lacking properties. The results to date have been less than maximal and, in many attempts, some properties diminish while others improve to varying degrees depending on the particular embodiments employed.

Other desired properties such as water repellency and flame spread rating were varied, sometimes adversely, as other properties mentioned heretofore were modified.

It is an object of the present invention to provide a substantially lightweight building product which has enhanced strength characteristics, flexural, tensile and compressive.

Another object of the present invention is to provide a superior building product that, in addition to enhanced strength, possesses superior abrasion resistance.

A further object is to provide a building product having superior thermal insulation properties.

An additional object of the present invention is to provide a process for the manufacturing of a building product as stated heretofore and as described hereinafter.

The building product of the present invention is comprised of from 20 to 95 percent expanded perlite, preferably 65 to 85 percent by weight; 5 to 80 percent, preferably 10 to 35 percent, by weight, of optimally refined corrugated boxboard based fiber and 0 to 15 percent, preferably 4 to 6 percent, by weight, of asphalt.

Although the present building product does not require the addition of any components other than those stated heretofore, it is possible, if desired, to add typical amounts of starch, wax, rosin, silicones, clay, boric acid and the like.

The perlite employed in the present invention is that known in the art as thermally expanded perlite. It is prepared from perlite ore which has been ground to typical granular size. The thermal expansion typically results in perlite particles ranging in size from less than .149 mm. to about 1.19 mm.

The corrugated boxboard fiber employed in the present invention can be new corrugated boxboard stock, if desired. However, it is a particular benefit of the present invention that the source can be waste corrugated boxes. Some of these waste boxes are entirely composed of kraft paper; most are composed of a corrugated layer of neutral sulphite semi chemical stock (NSSC) covered on each side by a layer of regular unbleached or bleached kraft paper.

The actual stock used may range from 100% NSSC to 100% kraft; however, it is preferable to employ stock containing about 40 to 75 percent, preferably 55 to 65 percent by weight, of the kraft base and 25 to 60 percent, preferably 35 to 45 percent by weight of NSSC. Especially advantageous is a stock mix consisting of about 60 percent kraft and about 40 percent NSSC as the fiber component of the present invention. It is possible to use all proportions within the ranges given above and such is embraced within this invention. The percentages given are based on air dry weight. It is known in the art that kraft paper is made up of relatively long fibers (3.0 to 5.0 mm.) coming from softwood sources such as pine, hemlock, Douglas fir, spruce and the like. The NSSC is composed of relatively shorter lengths (0.5 to 3.0 mm.) coming from hardwood such as oak, sweet gum, hickory, popular, beech and the like. It is also known in the art that the kraft paper is made by a sulfate process and the NSSC from a neutral sulphite semi chemical process from which it gets its initials.

The kraft and NSSC will normally be unbleached, but can be bleached and satisfactory for the present purpose. The components of corrugated boxboard are usually glued together by a starch based adhesive which is readily broken by soaking in water.

The asphalt that is employed in the present invention may be selected from the commercial aqueous asphalt emulsions that are readily available and typically contain about 60 percent solids.

In order to prepare in the laboratory the valuable building product of this invention, the corrugated boxboard stock is cut into relatively small pieces of any convenient size and shape, such as two or four inch strips of convenient length or two or four inch squares. Any other convenient size may be employed as desired.

On a commercial basis, the corrugated boxboard need not be cut into small pieces for processing. Whole bales of boxboard or flattened boxes in bales can be charged to the processing equipment without any reduction in size.

In order to protect the processing machinery and maintain control of the percentage of components, foreign material is conveniently removed during the pulping stage of the process including tapes, staples, synthetic material, wire, and any metallic or non-metallic foreign material. This is particularly necessary when waste corrugated boxes are employed such as contemplated in the present process. The fiber stock slurry contains about three and one-half to seven percent, preferably about four to five percent, by weight of fibrous stock. The water temperature can range from normal room temperature to approaching boiling, but in order to speed up the process a water temperature of at least 80° F. is desired and for best commercial results it is preferred to use water with a temperature of about 100 to 130° F. The fiber stock is then pulped until it is homogeneous and this normally takes from 30 to 60 minutes and typically 40 to 50 minutes.

The concentration of the slurry is then adjusted by adding water to reach a consistency of about one and a half to three (preferably two) percent fiber, by weight, in water. The pulped fiber is then refined by beating in order to hydrate, to cut and to macerate the fibers. The laboratory scale refining process usually takes about 40 to 80 minutes, typically 50 to 60 minutes using water at essentially room temperature. Commercially, of course, the refining time is sharply reduced, but similarly evaluated by Schopper-Reigler freeness value as described hereinafter.

A typical sample of corrugated box waste pulp refined in a Valley type beater in the range of 0–80 minutes was tested for Schopper-Reigler freeness. Fiber index values were determined on the pulp at the end of a 60 minute refining cycle. The refined stock was fibrous and non-gelatinous. The following data were obtained.

TABLE I

| Minutes refined in Valley type beater: | Schopper-Reigler freeness values in cc. |
|---|---|
| 0 | 880 |
| 10 | 640 |
| 20 | 530 |
| 40 | 230 |
| 60 | 180 |
| 80 | 120 |

TABLE II
Fiber Classification and Fiber Index 60 Min. Refined Corrugated Box Waste

| Sample number | Mesh size | Wt. oven dried, g. | Percent | Fiber length, mm. |
|---|---|---|---|---|
| 1 | +28 | 0.05 | 1.0 | 0.60 |
| 2 | +48 | 1.60 | 32.0 | 0.29 |
| 3 | +100 | 1.15 | 23.0 | 0.15 |
| 4 | +200 | 0.75 | 15.0 | 0.074 |
| 5 | −200 | 1.45 | 29.0 | 0.037 |
| Total 5 cuts | | 5.00 | 100.0 | |

Fiber Index $L = \frac{(W_1L_1)+(W_2L_2)+(W_3L_3)+(W_4L_4)+(W_5L_5)}{W_t}$ $= \frac{(.05\times.6)+(1.60\times.29)+(1.15\times.15)+}{5.0}$ $+ \frac{(.75\times.074)+(1.45\times0.037)}{5.0}$ $= .154$ mm.

Where the W's = oven dried wt./cut in grams.
Where the L's = Ave. fiber length/cut in mm.
Wt = Total wt. of oven dried pulp in grams.

In contrast, when one employs kraft paper alone, refined as indicated in the prior art until gelatinous and non-fibrous, one obtains Schopper-Reigler freeness values of less than 100 cc. and a fiber index of 0.058 to 0.061 mm.

In the present invention, one obtains valuable products in the Schopper-Reigler freeness range of 120 to 530 cc. especially in the range of 120 to 230 cc. and one must adhere rigidly to the identity and ranges of components in order to achieve the superior products of the present invention.

The aqueous asphalt emulsion, if used, is added with thorough mixing preferably after the fiber stock has been pulped and refined as described above. Next is blended the expanded perlite. If an asphalt emulsion is used, the pH of the fiber, perlite, asphalt emulsion slurry should be adjusted to release the asphalt from the emulsion and deposit it on the perlite and fiber. Aluminum sulfate is advantageously used for the purpose of pH adjustment (commercial paper makers' alum is satisfactory). Generally, one may employ acidic salts or acids themselves, preferably inorganic acids, such as sulfuric, hydrochloric or the like.

If desired, the asphalt emulsion may be added at any stage of the present process prior to the addition of the emulsion breaking agent, just described.

Under the conditions of the present invention, the asphalt additive, along with the perlite and fiber fines, are essentially retained within the building product of this invention as evidenced by the fact that a water white filtrate normally results at this stage of the present process.

Although no other additives are required for the valuable benefits of the present invention, if it is so desired, additives such as starch, wax, clay, boric acid or the like may be introduced at convenient points in the process.

The batch is mixed to homogeneity and fed to machinery to be formed into a mat. Water is removed by gravity and vacuum and the mat is compressed to any desired thickness from ½ to 4 inches or more as desired. The product is then cut into selected sizes and dried by conventional means such as a gas fired dryer. If desired, the mat, wet or dry as will be understood by those skilled in the art, may be covered by paper (asphalt coated or plain), plastic film, such as polyvinyl chloride, metal foil (such as aluminum), or by foam, such as polyurethane or others.

The building product thus formed is then cut into selected sizes, trimmed, stacked and packaged.

The present invention may be more fully understood from the following illustrative laboratory examples:

Example 1

A waste corrugated box comprising about 60 percent kraft and about 40 percent NSSC and weighing 1000 grams air dry were cut into 4 inch by 4 inch pieces and added to 14.28 liters of water at 130° F. The 7 percent slurry was then pulped for 15 minutes, using conventional equipment at 1800 r.p.m., and then 10.72 liters of water at 100° F. were added to give the slurry a consistency of 4 percent. The pulping was continued for 30 minutes (total pulping time—45 minutes) at which time the water had a temperature of 98° F. Three liters of the 4 percent slurry were removed and reduced to a 2 percent slurry by the addition of water, in which the final slurry temperature was 77° F. The slurry was then placed in a Valley type beater. Samples were taken at the beginning of the refining process and at regular intervals and tested according to the Schopper-Riegler freeness values giving readings as shown in Table I.

Example 2

A board containing 0 percent asphalt was prepared as follows: 31.2 grams (oven dried basis) of optimally refined waste corrugated boxboard based fiber was weighed out and slurried with 2315 grams of tap water warmed to about 125° F. The above slurry was mixed for 5 minutes in a 4 liter beaker after which 103.8 grams of typical expanded perlite was slowly mixed with the aqueous slurry. After an additional 5 minutes of mixing, the slurry was poured into a forming box, dewatered, pressed, dried and tested. The resulting product had a density of 9.9 pounds per cubic foot and a MOR of 115 p.s.i.

Tests on lab boards (all of which had the same basic formulation by weight 23 percent fiber, 72 percent perlite and 5 percent asphalt emulsion solids) prepared from refined pulps reveal that maximum modulus of rupture (MOR) values are obtained using refining times of at least 40 minutes, preferably 60 minutes, using a Valley type beater, although values superior to present commercial products using different fiber stock are obtained after about only 20 minutes of refining time. For instance, with board by weight consisting of 23 percent refined fiber (about 40 percent NSSC and about 60 percent kraft), 72 percent expanded perlite and 5 percent asphalt solids made to densities of 9 and 10 p.c.f., MOR values consistently exceeded 100 pounds per square inch and typically reached 120 and above with retention of the other desirable characteristics. For instance, with the same boards there resulted internal bond values of 14 to 20 p.s.i. and compression resistance of 168 to 212 p.s.i. at 50 percent consolidation with extremely low water absorption.

The building product of this present invention can be prepared for commercial use as an insulating board, form board, acoustical board, panel board, core board and structural board and the like in a wide range of densities, but particularly in the range 8 to 15 p.c.f. Throughout the range of densities just stated the products of this invention exhibit superior flexural strengths as evidenced by the modulus of rupture (MOR) according to ASTM C-203. Typically, one obtains values of about 85 p.s.i. for board of 8 p.c.f. density; values of up to 160 p.s.i. and typically at least 120 with 10 p.c.f. density board; and values of up to and greater than 260 and typically at least 220 p.s.i. for 15 p.c.f. density board. In contrast, similar board using newsprint as the fiber portion and having a 10 p.c.f. density gives results of about 65 p.s.i. As a matter of fact, because of the relatively low MOR results that are typical of newsprint fiber perlite board, that board is limited from a practical basis essentially to a minimum density of about 10 p.c.f. No such restriction is imposed on the product of this invention. The present product exhibits high strength and thereby minimizes breakage during manufacture and handling, even at densities as low as 7 p.c.f.

The building product of the present invention also exhibits superior internal bond or tensile strengths as evaluated by ASTM D-1037. Whereas typical perlite newsprint board of 10 p.c.f. density gives values of about 6 p.s.i., a corresponding 10 p.c.f. product of the present invention gives values of about 19 p.s.i. Also, the present invention produces board having internal bond of about 25 p.s.i. for 15 p.c.f. density board. The present product is, therefore, highly resistant to forces, such as wind, that are normally to be expected during use, such as on a roof.

The product of this invention exhibits superior compression resistance as evaluated by ASTM D-165 and, thereby, maintains dimensional integrity and insulating qualities.

The present building product shows abrasion resistance superior to corresponding perlite newsprint board and thereby reducing the generation of dust. The present board is at least comparable to newsprint board in having high water resistance and low thermal conductivity (a low K factor), and accordingly suffers no property detriments while achieving enhanced values in other categories, as described hereinabove.

In order to achieve all of the valuable results of the present invention, one must follow the teachings of this invention, particularly in the use of the refined corrugated boxboard stock which prepared as described above is fibrous and non-gelatinous and gives an interfelting action on which the success of this invention depends.

Some variations can, of course, be made within the spirit of this invention.

We claim:

1. A building product comprising 20 to 95 percent, by weight, expanded perlite; 5 to 80 percent, by weight, refined corrugated boxboard based non-gelatinous fiber having a Schopper-Riegler freeness of from about 530 cc. to about 120 cc. and a fiber index of from 0.07 mm. to about 0.30 mm.; and 0 to 15 percent, by weight, asphalt.

2. A product according to claim 1 wherein said perlite is present in the amount of 65 to 85 percent, by weight; said fiber is present in the amount 10 to 35 percent, by weight; and said asphalt is present in the amount of 4 to 6 percent, by weight.

3. A product according to claim 1 wherein said fiber is comprised of about 40 to 75 percent, by weight, kraft and about 25 to 60 percent by weight of neutral sulphite semi-chemical.

4. A product according to claim 1 wherein said fiber is comprised of about 55 to 65 percent, by weight, kraft and about 35 to 45 percent, by weight, of neutral sulphite semi-chemical.

5. A method for preparing a building product of from 20 to 95 percent, by weight, expanded perlite; 5 to 80 percent, by weight, refined corrugated boxboard based non-gelatinous fiber and 0 to 15 percent, by weight, asphalt, comprising pulping the fibrous stock in water until homogeneous, refining the homogeneous pulped fiber, to a Schopper-Riegler freeness of from about 530 cc. to about 120 cc. and a fiber index of from about 0.07 mm. to about 0.30 mm.; adding an aqueous asphalt emulsion to the said fiber, blending expanded perlite into the fiber-asphalt emulsion, adding an agent to release the asphalt from its emulsion and forming the resultant mixture into a building product.

6. A method according to claim 5 comprising pulping for about 40 to 50 minutes in water of about 100 to 130° F. at a slurry concentration of about 3.5 percent, by weight, and refining the corrugated boxboard based fiber to an optimum Schopper-Riegler freeness of from about 230 cc. to about 120 cc.

7. A method according to claim 5 wherein said emulsion is added at any selected stage of said method prior to the addition of said agent.

References Cited

UNITED STATES PATENTS

| | | | |
|---|---|---|---|
| 2,626,872 | 1/1953 | Miscall et al. | 106—122 |
| 2,634,208 | 4/1953 | Miscall et al. | 106—282 X |
| 3,379,608 | 4/1968 | Roberts et al. | 162—145 |

JOAN B. EVANS, Primary Examiner

U.S. Cl. X.R.

117—158; 162—145, 147, 171; 252—62